(12) United States Patent
Otani (10) Patent No.: US 8,881,778 B2
(45) Date of Patent: Nov. 11, 2014

(54) MOTORCYCLE TIRE

(75) Inventor: Masafumi Otani, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 381 days.

(21) Appl. No.: 13/336,101

(22) Filed: Dec. 23, 2011

(65) Prior Publication Data

US 2012/0160380 A1    Jun. 28, 2012

(30) Foreign Application Priority Data

Dec. 27, 2010 (JP) ................. 2010-290854

(51) Int. Cl.
*B60C 11/117* (2006.01)
*B60C 11/03* (2006.01)

(52) U.S. Cl.
CPC .......... *B60C 11/0302* (2013.01); *B60C 11/032* (2013.01); *B60C 2011/0374* (2013.01); *B60C 2011/0381* (2013.01); *B60C 2011/0383* (2013.01); *B60C 11/033* (2013.01); *B60C 2200/10* (2013.01)
USPC ............. 152/209.11; 152/209.17; 152/209.28

(58) Field of Classification Search
CPC .... B60C 11/033; B60C 11/032; B60C 11/03; B60C 2011/0374; B60C 2011/0381; B60C 2011/383; B60C 2200/10
USPC ............................ 152/209.11, 209.17, 209.28
See application file for complete search history.

(56) References Cited

U.S. PATENT DOCUMENTS

| | | | | |
|---|---|---|---|---|
| 6,200,401 | B1 * | 3/2001 | Watkins et al. | ............ 156/110.1 |
| 2009/0308515 | A1 | 12/2009 | Matsunaga | |
| 2010/0193095 | A1 * | 8/2010 | Nakagawa | ................ 152/209.5 |

FOREIGN PATENT DOCUMENTS

| | | | |
|---|---|---|---|
| EP | 2181864 | * | 5/2010 |
| JP | 05-201207 | * | 8/1993 |
| JP | 95108604 B2 | * | 11/1995 |
| JP | 2009-298387 A | | 12/2009 |

OTHER PUBLICATIONS

English machine translation of JP05-201207, dated Aug. 1993.*
English machine translation of JP95108604B2, dated Nov. 1995.*

* cited by examiner

*Primary Examiner* — Steven D Maki
*Assistant Examiner* — Robert Dye
(74) *Attorney, Agent, or Firm* — Birch, Stewart, Kolasch & Birch, LLP (57) ABSTRACT

A motorcycle tire 1 comprising tread portion 2 having inclined main grooves 11 including main part 13 extending to cross tire equator C from a tire equator side toward a tread edge side while inclining to a former grounding side in a tire rotation direction wherein an inclination angle of main part 13 at the tire equator is from 0 to 15°, and a plurality of inclined sub-grooves 12 extending between the main grooves 11, 11 from axially outward of the tire equator while inclining in the same direction as the main part 13, and the tread portion 2 satisfying a relationship of: $Lc < Lm < Ls$, or $Lc > Lm > Ls$ wherein Lc is a land ratio of crown region Cr, Ls is a land ratio of a pair of shoulder regions Sh, and Lm is a land ratio of a pair of middle regions Md.

14 Claims, 3 Drawing Sheets

MOTORCYCLE TIRE

BACKGROUND OF THE INVENTION

The present invention relates to a tire for motorcycles, and more particularly to a motorcycle tire having an improved steering stability with maintaining a rolling resistance performance and a drainage performance.

In recent years, a motorcycle tire having a reduced rolling resistance attracts attention in order to improve the fuel consumption performance in view of global environmental problems or the like. For example, JP 2009-298387 A proposes a motorcycle tire having a circumferential main groove extending continuously on the tire equator of a tread portion in the circumferential direction of the tire. In such a motorcycle tire, the rigidity in a central region of the tread portion is reduced to increase the ground contact width of the tire at the time of straight running, whereby the ground contact pressure is reduced to reduce the rolling resistance. Further, since such a circumferential groove extends continuously in the tire circumferential direction, a water film present between the tread surface and a road surface can be smoothly guided to enhance the drainage performance.

However, this motorcycle tire has a problem that the steering responsiveness is deteriorated in association with decrease in rigidity of the center region of the tread portion at the time of cornering at which a small camber angle is given and the center region mainly contacts the ground. Further, this motorcycle tire has a problem that the transition performance from straight running to cornering in which the ground contact surface shifts from the center region to an edge region located axially outward of the center region, is deteriorated, thus resulting in deterioration of the steering stability, since a rigidity difference between the center region and the edge region tends to become too large.

Accordingly, it is an object of the present invention to provide a tire for motorcycles capable of improving the steering stability with maintaining a good rolling resistance performance and a good drainage performance.

This and other objects of the present invention will become apparent from the description hereinafter.

SUMMARY OF THE INVENTION

The above-mentioned object has now been achieved by providing an outer surface of the tread portion of a motorcycle tire with a plurality of inclined main grooves each including a main part extending to cross the tire equator from a tire equator side toward a tread edge side while inclining to a first grounding side of the tire in the tire rotation direction wherein the angle of the main part at the tire equator is from 0 to 15° with respect to the tire circumferential direction, and a plurality of inclined sub-grooves disposed between the adjacent inclined main grooves and extending from axially outward of the tire equator while inclining in the same direction as the main part of the inclined main groove so that a crown region, a middle region and a shoulder region of the tread portion have a specific relationship of land ratios.

In accordance with the present invention, there is provided a motorcycle tire comprising a tread portion with an outer surface curved in an arc-like shape to have a radially outwardly convex profile in the transverse cross section and extending from the tire equator to the both tread edges, the tread portion including, on its outer surface, a plurality of inclined main grooves disposed at intervals in a tire circumferential direction and each including a main part extending to cross the tire equator from a tire equator side toward a tread edge side while inclining to a former grounding side of the tire in a tire rotation direction wherein an inclination angle of the main part at the tire equator is from 0 to 15° with respect to the tire circumferential direction, and a plurality of inclined sub-grooves disposed between the circumferentially adjacent inclined main grooves and extending from axially outward of the tire equator while inclining in the same direction as the main part of the inclined main groove, and the tread portion satisfying a relationship of:

$$Lc<Lm<Ls, \text{ or } Lc>Lm>Ls$$

wherein Lc is a land ratio of a crown region which is a region of 33% of a tread development width centered on the tire equator, Ls is a land ratio of a pair of shoulder regions each ranging from a tread edge to 17% of the tread development width, and Lm is a land ratio of a pair of middle regions located between the crown region and the shoulder regions.

Preferably, the absolute value |Lm−Lc| of a difference between the land ratio Lm of the middle regions and the land ratio Lc of the crown region and the absolute value |Ls−Lm| of a difference between the land ratio Ls of the shoulder regions and the land ratio Lm of the middle regions are from 0.5 to 5%, respectively.

Preferably, the inclination angle α relative to the tire circumferential direction of the main part of the inclined main grooves is gradually increased from the tire equator side toward the tread edge.

Preferably, the main part of the inclined main grooves has a circumferential length of 70 to 100% of the tread development width.

Preferably, the inclined sub-grooves have, at their axially inner end portions, a tapered portion in which the groove width and the inclination angle relative to the tire circumferential direction are gradually decreased.

Preferably, the inclined main grooves comprise first inclined main grooves each having a main part extending toward one tread edge side, and second inclined main grooves each having a main part extending toward the other tread edge side, and the first and second inclined main grooves are alternately disposed in the tire circumferential direction. In this case, the inclined sub-grooves comprise first sub-grooves inclined in the same direction as the main part of the first inclined main grooves, and second sub-grooves inclined in the same direction as the main part of the second inclined main grooves, and a plurality of the first sub-grooves are disposed between the adjacent first inclined main grooves, and a plurality of the second sub-grooves are disposed between the adjacent second inclined main grooves.

The above-mentioned plurality of the first sub-grooves disposed between the adjacent two first main grooves and the plurality of the second sub-grooves disposed between the adjacent two second main grooves include at least a first grounding sub-groove and a later grounding sub-groove, respectively. It is preferable that a distance in the circumferential direction between an axially inner end of the later grounding sub-groove and an axially outer end of the main part of an inclined main groove adjacent to the later grounding sub-groove on the later grounding side and inclined in the same direction as this sub-groove is from −20 to +20 mm, and a distance in the circumferential direction between an axially outer end of the later grounding sub-groove and an axially inner end of the main part of an inclined main groove adjacent to the later grounding sub-groove on the first grounding side and inclined in the same direction as this sub-groove is from −20 to +20 mm.

Preferably, a distance in the circumferential direction between axially inner ends of the circumferentially adjacent two inclined sub-grooves is from 45 to 75 mm.

In the specification, the "dimensions" of respective parts or portions of the tire denotes those measured under no loading in a standard state that the tire is mounted on a standard rim and inflated to a normal inner pressure, unless otherwise noted. The term "standard rim" denotes a rim defined for every tire in a standardizing system on which the tire is based and, for example, is called "standard rim" in JATMA, "Design Rim" in TRA and "Measuring Rim" in ETRTO. The term "normal inner pressure" denotes an air pressure defined for every tire in the standardizing system and is, for example, the "maximum air pressure" in JATMA, the maximum value recited in the table of "Tire Load Limits at Various Cold Inflation Pressures" in TRA, and the "Inflation Pressure" in ETRTO.

Since the main part of the inclined main grooves crosses the tire equator, a volume of rubber in the neighborhood of the tire equator is decreased to decrease the tread rigidity. Therefore, since the ground contact width during straight running is increased, the ground contact pressure can be decreased to decrease the rolling resistance. Further, since the inclined main grooves do not greatly decrease the tread rigidity of a portion in the neighborhood of the tire equator as compared with a circumferential groove extending continuously in the tire circumferential direction, decrease in steering responsiveness can be suppressed. Further, since the main part of the inclined main grooves is inclined on the tire equator at an angle of from 0 to 15° relative to the tire circumferential direction, a water film present between the tread surface and a road surface can be smoothly guided and a good drainage performance can be secured.

Further, since the tread portion of the motorcycle tire of the present invention has crown, middle and shoulder regions satisfying a specific relationship of land ratios such that the tread rigidity can be smoothly gradually decreased or increased from the tire equator side toward the tread edge, the transition performance from straight running to cornering can be enhanced.

DETAILED DESCRIPTION OF THE INVENTION

An embodiment of the present invention will now be explained with reference to the accompanying drawings.

Figure 1:
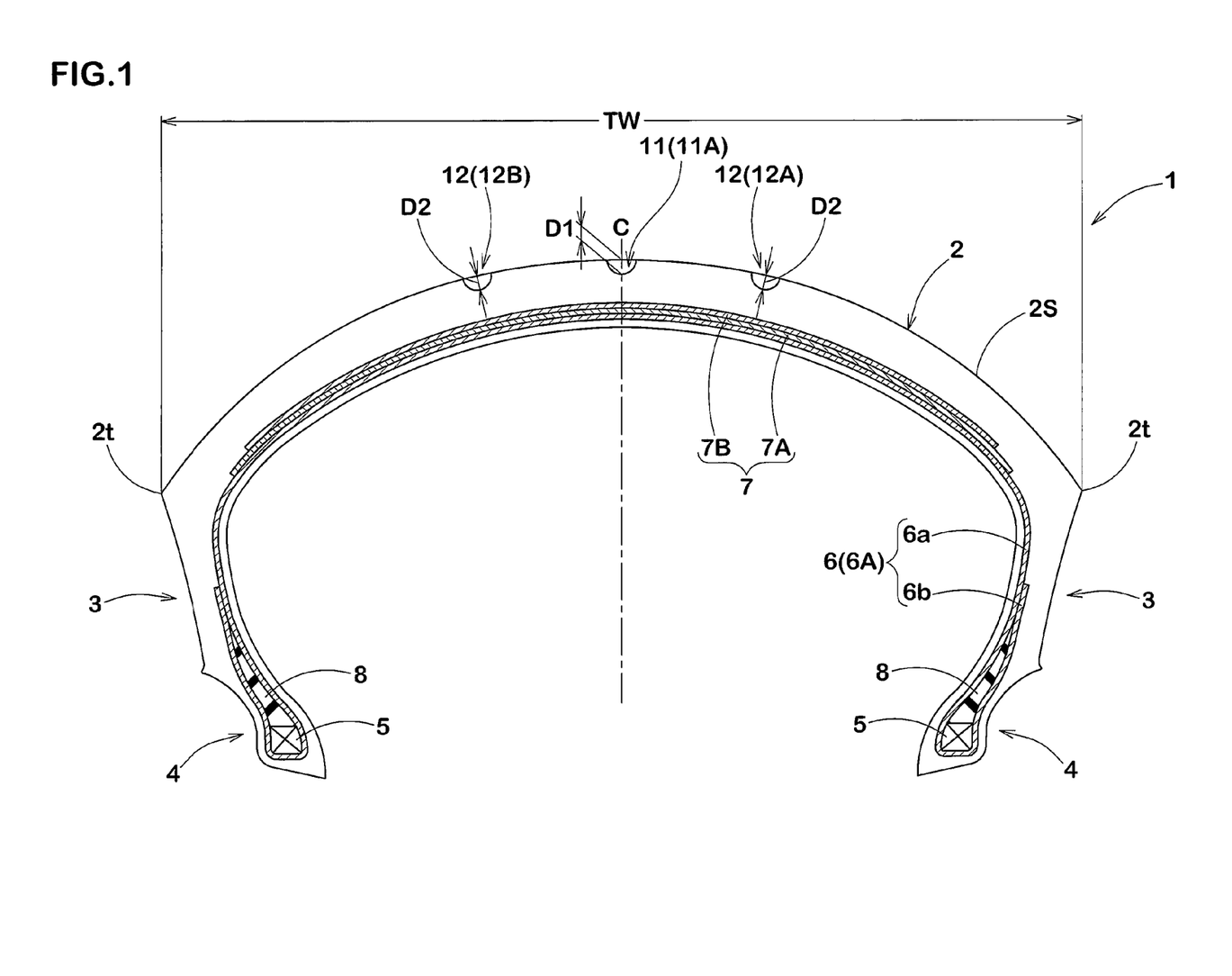
FIG. 1 is a cross sectional view of a pneumatic tire for motorcycles showing an embodiment of the present invention.
Figure 2:
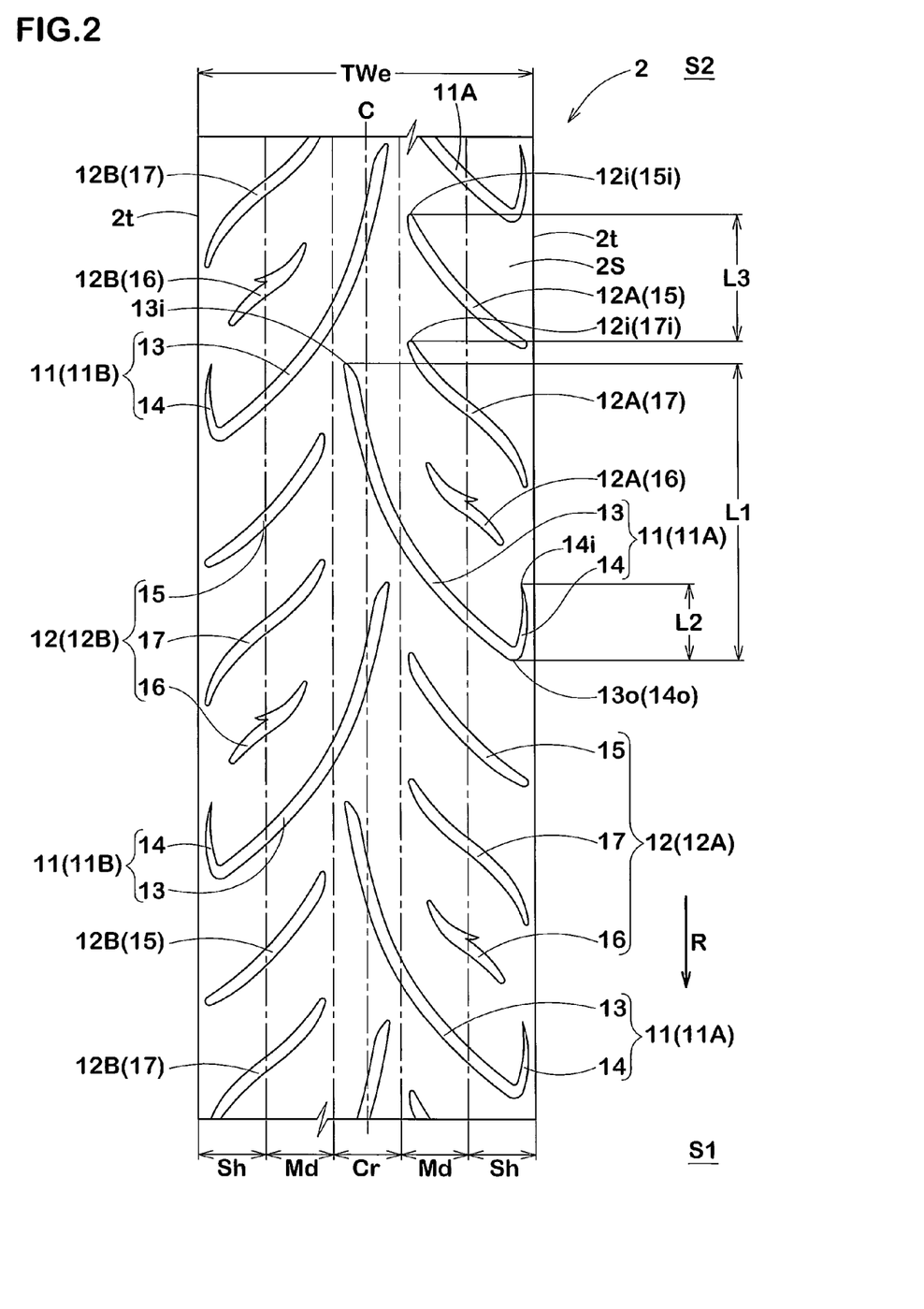
FIG. 2 is a development view of a tread portion of the motorcycle tire of FIG. 1.

Referring to FIG. 1 and FIG. 2, a motorcycle tire 1 according to the present invention includes a carcass 6 extending from a tread portion 2 to each of a pair of bead cores 5 in opposing bead portions 4 through sidewall portions 3, and a tread reinforcing layer 7 disposed radially outward of the carcass 6 in the tread portion 2. The tire 1 is provided with a tread pattern to which a tire rotation direction R is specified. The tread portion 2 has a curved outer surface 2S extending in a radially outwardly convex circular arc shape from tire equator C toward both tread edges 2t, 2t. A tread width TW which is an axial distance between the tread edges 2t, 2t provides the maximum width of the tire, whereby a sufficient ground contact area is secured even in cornering at a large bank angle.

The carcass 6 comprises a single carcass ply as shown in this embodiment, or two or more carcass plies 6A. The carcass ply 6A is composed of a main portion 6a that extends from the tread portion 2 to the bead cores 5 embedded in the bead portions 4 through the sidewall portions 3, and turnup portions 6b that extend from both axial ends of the main portion 6a and are turned up around the bead cores 5.

The carcass ply 6A includes carcass cords arranged at an angle of, for instance, 75 to 90°, preferably 80 to 90°, with respect to the tire equator C. As the carcass cords are preferably used organic fiber cords such as nylon, polyester, rayon and so on.

Between the main portion 6a and each turnup portion 6b is disposed a bead apex 8 made of a hard rubber that extends radially outwardly from the bead core 5 in a tapered manner.

The tread reinforcing layer 7, e.g., belt layer and/or band layer, comprises at least one ply in which reinforcing cords are arranged at an angle of, for instance, 5 to 40° with respect to the tire equator C. The tread reinforcing layer 7 shown in this embodiment is a belt layer composed of radially inner and outer belt plies 7A and 7B stacked so that the belt cords in one ply cross the belt cords in the other ply. Examples of the reinforcing cord are, for instance, organic fiber cords such as rayon and aramid, and steel cords.

The motorcycle tire 1 of the present invention is provided on the outer surface 2S of the tread portion 2 with, as shown in FIG. 2, a plurality of inclined main grooves 11 disposed at intervals in the tire circumferential direction and a plurality of inclined sub-grooves 12 disposed between the circumferentially adjacent inclined main grooves 11, 11. Each of the inclined main grooves 11 includes a main part 13 extending to cross the tire equator C from a tire equator side toward a tread edge 2t side while inclining to a former grounding side S1 of the tire in a tire rotation direction. At least two inclined sub-grooves 12 are disposed between two circumferentially adjacent inclined main grooves 11, 11 and extend axially outwardly from axially outward of the tire equator C while inclining in the same direction as the main part 13 of the inclined main groove 11.

These main grooves and sub-grooves 11 and 12 are formed so that the outer surface 2S of the tread portion 2 satisfies a relationship of:

$$Lc<Lm<Ls, \text{ or } Lc>Lm>Ls$$

wherein Lc is a land ratio of a crown region Cr of 33% of a tread development width TWe centered on the tire equator C, Ls is a land ratio of a pair of shoulder regions Sh, Sh each ranging from the tread edge 2t to 17% of the tread development width TWe, and Lm is a land ratio of a pair of middle regions Md, Md located between the crown region Cr and the shoulder regions Sh, Sh.

The tire 1 having such a land ratio relationship has an enhanced steering stability, since the rigidity of the tread portion 2 can be smoothly gradually decreased or increased from the tire equator C side toward the tread edges 2t so as to enhance the transition performance from straight running to cornering.

The term "land ratio" Lc, Lm or Ls as used herein denotes a ratio of a ground contact area (surface area) of a land portion to a surface area of each region Cr, Md or Sh measured in the state that all tread grooves formed in the outer surface 2S of the tread portion 2 are filled up.

If the absolute value |Lm−Lc| of a difference between the land ratio Lm of the middle region Md and the land ratio Lc of the crown region Cr is large, a difference in the tread rigidity between the crown region Cr and the middle region Md becomes too large, so there is a possibility that the transition performance cannot be sufficiently enhanced. On the other hand, if the absolute value |Lm−Lc| is too small, the specified land ratio relationship tends not to be maintained due to change in land ratios by wear. From such points of view, it is preferable that the absolute value |Lm−Lc| is at most 5%, especially at most 3%, and is at least 0.5%.

Similarly, it is preferable that the absolute value |Ls−Lm| of a difference between the land ratio Ls of the shoulder region Sh and the land ratio Lm of the middle region Md is at most 5%, especially at most 3%, and is at least 0.5%.

The inclined main groove 11 comprises a first inclined main groove 11A, the main part 13 of which extends toward one tread edge 2t, and a second inclined main groove 11B, the main part 13 of which extends toward the other tread edge 2t. These first and second inclined main grooves 11A and 11B are disposed alternately at intervals in the tire circumferential direction without intersecting with each other. These main grooves 11A and 11B serve to enhance the drainage performance at the time of not only straight running but also cornering, since they are disposed evenly over a wide range of the outer surface 2S of the tread portion 2.

Each of the first and second inclined main grooves 11A and 11B comprises the main part 13 extending to cross the tire equator C from the tire equator C side toward the tread edge 2t side while inclining to the former grounding side S1, and a sub-part 14 extending in the tire circumferential direction from an axially outer end of the main part 13 toward a later grounding side S2 of the tire in the tire rotation direction, thus having an approximately fishhook shape. Such first and second inclined main grooves 11A and 11B are formed, for example, to have a groove width W1 of about 3.0 to about 6.5 mm and a maximum groove depth D1 of about 3.5 to about 5.5 mm.

Figure 3:
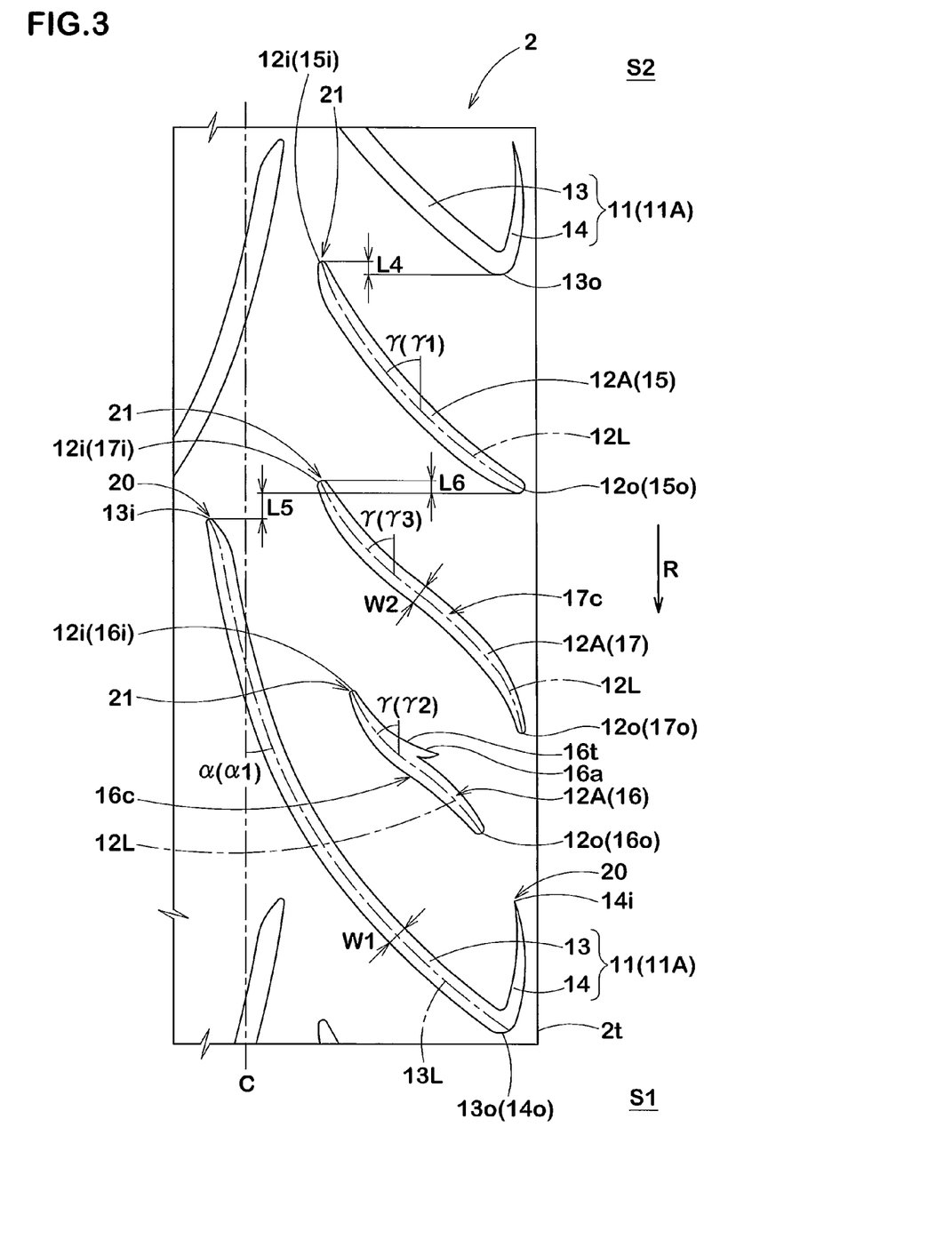
FIG. 3 is a partially enlarged view of FIG. 2.

As shown in FIG. 3 in an enlarged fashion, the main part 13 of the inclined main groove 11 in this embodiment has an approximately constant width W1, and it is formed to smoothly curve while gradually increasing an inclination angle $\alpha$ relative to the tire circumferential direction from its axially inner end 13i located on the tire equator C side to its axially outer end 13o located on the tread edge 2t side. The inclination angle $\alpha1$ of the main part 13 at the tire equator C is from 0 to 15° with respect to the tire circumferential direction. The inclination angle $\alpha$ or $\alpha1$ denotes an angle of a groove center line 13L of the main part 13 relative to the tire circumferential direction.

The sub-part 14 of the inclined main groove 11 is continuous with the outer end 13o of the main part 13, turns here toward the later grounding side S2 and extends in the circumferential direction. The sub-part 14 in this embodiment extends in a curved form convex to the tread edge 2t side from its end 14o on the former grounding side S1 to its end 14i on the later grounding side S2.

Since the main part 13 of the first and second inclined main grooves 11A and 11B are formed so as to cross the tire equator C, a volume of rubber in the neighborhood of the tire equator C can be decreased to decrease the tread rigidity. Therefore, the tread portion 2 can be flexibly deformed against an out-of-plane bending rigidity caused by grounding, whereby the ground contact width during straight running can be increased to decrease the ground contact pressure. Therefore, the rolling resistance can be decreased without specially using a low hysteresis rubber having a small loss tangent tan $\delta$ or a high elastic rubber having a large complex modulus, which invite deterioration of steering stability or ride comfortability.

Further, since the main part 13 can smoothly change the rigidity of the tread portion 2 in a region ranging from the tire equator C to a is location near the tread edge 2t, the transition performance is also enhanced. Furthermore, since the main part 13 does not greatly decrease the tread rigidity of a portion in the neighborhood of the tire equator C as compared with a circumferential groove extending continuously in the tire circumferential direction, decrease in steering responsiveness can be suppressed when a motorcycle is leaned at a small bank angle where the tread portion in the neighborhood of the tire equator C mainly contacts the ground. Therefore, such a main part 13 is helpful to enhance the steering stability.

Further, since the inclination angle $\alpha1$ at the tire equator C of the main part 13 is set to a small angle relative to the tire circumferential direction, a water film present between the tread surface 2S and a road surface can be smoothly guided, so a good drainage performance can be secured.

On the other hand, the sub-part 14 of the inclined main grooves 11 serves to efficiently discharge a water film on a road surface when a motorcycle is leaned at a large bank angle where a tread edge side portion of the tread surface 2S mainly contacts the ground. Therefore, the drainage performance can be further enhanced.

If the inclination angle $\alpha1$ is too large, there is a possibility that the effects as mentioned above are not obtained, and if the inclination angle $\alpha1$ is too small, there is a possibility that the tread rigidity in the neighborhood of the tire equator C is excessively decreased. From such viewpoints, the inclination angle $\alpha1$ relative to the tire circumferential direction is set to at most 15°, preferably at most 12°, and to at least 0°, preferably at least 5°.

From the same viewpoints as above, a circumferential length L1 of the main part 13 between the inner end 13i and the outer end 13o is preferably at least 70%, more preferably at least 75%, of the tread development width TWe, and is preferably at most 100%, more preferably at most 95%, of the tread development width TWe.

Further, if a circumferential length L2 of the sub-part 14 between its end 14o on the former grounding side S1 and its end 14i on the later grounding side S2 is too small, the water film is not sufficiently guided when the bank angle is large. On the other hand, if the circumferential length L2 is too large, there is a possibility that a grip force is not sufficiently exhibited during cornering, since the rigidity of the tread portion on the tread edge 2t side is decreased excessively. Therefore, it is preferable that the circumferential length L2 of the sub-part 14 is at least 20%, especially at least 25%, of the circumferential length L1 of the main part 13, and is at most 45%, especially at most 40%, of the circumferential length L1.

As shown in FIG. 3, it is preferable to provide the axially inner end 13i of the main part 13 of the inclined main groove 11 and the end 14i on the later grounding side S2 of the sub-part 14 with a tapered portion 20 in which the groove width W1 is gradually decreased toward the later grounding side S2. Such a tapered end portion 20 is helpful to further enhance the rolling resistance performance, since the tread rigidity at the groove end portions 13i and 14i is smoothly changed.

The inclined sub-groove 12 comprises, as shown in FIG. 2, a first inclined sub-groove 12A which is located between circumferentially adjacent first inclined main grooves 11A, 11A and is inclined in the same direction as the main part 13 of the first inclined main grooves 11A, and a second inclined sub-groove 12B which is located between circumferentially adjacent second inclined main grooves 11B, 11B and is inclined in the same direction as the main part 13 of the second inclined main grooves 11B. As to each of the first and second inclined sub-grooves 12A and 12B, a plurality of inclined sub-grooves 12A or 12B, e.g., three inclined sub-grooves 15, 16 and 17, are disposed in the tire circumferential direction between adjacent two first inclined main grooves 11A, 11A or between adjacent two second inclined main grooves 11B, 11B. Preferably, these first or second inclined main and sub-grooves are disposed at approximately regular intervals in the circumferential direction.

Each of the first and second inclined sub-grooves 12A and 12B extends from a location axially outward of the tire equator C toward the tread edge 2t side while inclining. Preferably, the first and second inclined sub-grooves 12A and 12B have a groove width W2 of about 4.5 to about 7.0 mm and a maximum groove depth D2 of about 3.5 to about 5.5 mm.

Such first and second inclined sub-grooves 12A and 12B serve to further enhance the rolling resistance performance, since the rigidity of the tread portion 2 can be smoothly changed between the circumferentially adjacent first or second inclined main grooves 11A, 11A or 11B, 11B. Further, the first and second inclined sub-grooves 12A and 12B serve to further enhance the drainage performance with maintaining the steering responsiveness at a low bank angle, since lowering of rubber volume in the neighborhood of the tire equator C is suppressed.

If a circumferential distance L3 between axially inner ends 12i, 12i of circumferentially adjacent first or second inclined sub-grooves 12A or 12B is too large, there is a possibility that the tread rigidity cannot be smoothly changed. If the distance L3 is too small, the rubber volume of the tread portion 2 may be excessively decreased. From such points of view, it is preferable that the circumferential distance L3 is at most 75 mm, especially at most 70 mm, and is at least 45 mm, especially at least 50 mm.

Preferably, the first or second inclined sub-grooves 12A and 12B are disposed so that circumferentially adjacent inclined sub-grooves are partly overlapped in the circumferential direction, in other words, at least an axially outer end portion of an inclined sub-groove 12 and at least an axially inner end portion of an inclined sub-groove 12 circumferentially adjacent thereto are located in a region circumferentially common to each other. It is preferable that a circumferential distance L6 (shown in FIG. 3) between an axially inner end 12i of an inclined sub-groove 12 and an axially outer end 12o of the adjacent inclined sub-groove 12 is from 1 to 20 mm.

The first and second inclined sub-grooves 12A and 12B in this embodiment have, at their axially inner end 12i, a tapered portion 21 in which the groove width W2 and an inclination angle γ relative to the tire circumferential direction are gradually decreased. Such a tapered end portion 21 serves to further enhance the rolling resistance performance, since the tread rigidity at the axially inner end portions of the first and second inclined sub-grooves 12A and 12B is smoothly changed. The inclination angle γ denotes an angle of a groove center line 12L of the first or second inclined sub-groove 12A or 12B relative to the tire circumferential direction.

A plurality of the first or second inclined sub-grooves 12A or 12B in this embodiment disposed between the circumferentially adjacent first or second main grooves 11, 11 are composed of three grooves, i.e., a later grounding sub-groove 15 disposed on the later grounding side S2 in the tire rotation direction R, a former grounding sub-groove 16 disposed on the former grounding side S1, and a middle sub-groove 17 disposed between the later ground sub-groove 15 and the former ground sub-groove 16.

The later grounding inclined sub-groove 15 is formed so as to smoothly curve from an axially inner end 15i to an axially outer end 15o while gradually increasing an angle γ1 relative to the circumferential direction. The inner end 15i is located axially outward of the tire equator C, and the outer end 15o is located in the vicinity of the tread edge 2t. Such a later grounding sub-groove 15 can efficiently discharge a water film on a road a deep bank angle without excessively reducing the volume of a rubber present in the vicinity of the tire equator C.

The later grounding inclined sub-groove 15 in this embodiment is disposed so that its inner end 15i is located in proximity, in the circumferential direction, to an axially outer end 13o of a main part 13 of an inclined main groove 11 which is adjacent on the later grounding side S2 to the sub-groove 15 and is inclined in the same direction as the sub-groove 15, in other words, so that a circumferential distance L4 between the inner end 15i of the later grounding inclined sub-groove 15 and the outer end 13o of the main part 13 of the circumferentially adjacent inclined main groove 11 is small. Further, the later grounding inclined sub-groove 15 is disposed so that its outer end 15o is located in proximity, in the circumferential direction, to an axially inner end 13i of a main part 13 of an inclined main groove 11 which is adjacent on the former grounding side S1 to the sub-groove 15 and is inclined in the same direction as the sub-groove 15, in other words, so that a circumferential distance L5 between the outer end 15o of the later grounding inclined sub-groove 15 and the inner end 13i of the main part 13 of the circumferentially adjacent inclined main groove 11 on the former grounding side S1 is small.

Such a later grounding inclined sub-groove 15 can significantly enhance the drainage performance, since grooves can be formed without substantial interruption in the circumferential direction. The later grounding inclined sub-groove 15 also can further enhance the steering stability, since a rigidity change of the tread portion 2 between inclined main grooves 11, 11 adjacent in the tire rotation direction R becomes more smooth.

If the circumferential distance L4 between the inner end 15i of the later grounding inclined sub-groove 15 and the outer end 13o of the main part 13 of the circumferentially adjacent inclined main groove 11 is large, there is a possibility that the effects as mentioned above cannot be sufficiently exhibited. The axially inner end 15i of the later grounding sub-groove 15 may be located on the later grounding side S2 of the axially outer end 13o of the main part 13 of the circumferentially adjacent main groove 11 as shown in FIG. 3. However, if the circumferentially overlapping distance L4 is too large, the steering stability may be deteriorated owing to excessive decrease in the rubber volume of the tread portion 2. From such points of view, it is preferable that the circumferential distance L4 is at most 20 mm, especially at most 10 mm, and is at least −20 mm, especially at least −10 mm.

Similarly, it is preferable that the circumferential distance L5 between the outer end 15o of the later grounding inclined sub-groove 15 and the inner end 13i of the main part 13 of the inclined main groove 11 circumferentially adjacent on the former grounding side S1 is at most 20 mm, especially at most 10 mm, and is at least −20 mm, especially at least −10 mm.

The former grounding inclined sub-groove 16 in this embodiment is formed into a shape such that a portion from its axially inner end 16i to a central portion 16c including a center in the circumferential direction of the sub-groove 16 is smoothly curved with gradually increasing an inclination angle γ2 relative to the circumferential direction, and a portion from the central portion 16c to its axially outer end 16o is smoothly curved with gradually decreasing the inclination angle γ2. Thus, the center line 12L of the former grounding sub-groove 16 is slightly curved in an S-shape.

The former grounding inclined sub-groove 16 is disposed so that its axially inner end 16i is located axially outward of the axially inner end 15i of the later grounding inclined sub-groove 15, and its axially outer end 16o is located axially inward of the axially outer end 15o of the later grounding inclined sub-groove 15. Thus, the former grounding sub-groove 16 has an axial length shorter than the later grounding sub-groove 15. The axially outer end portion 16o of the former grounding sub-groove 16 extends toward the end 14i on the later grounding side S2 of the sub-part 14 of the main groove 11 and terminates axially inward of the end 14i.

Such a former grounding sub-groove 16 serves to enhance the transition performance, since the rigidity of the tread portion 2 between it and the sub-part 14 can be smoothly changed in the axial direction with suppressing excessive decrease in the rubber volume.

The former grounding sub-groove 16 may be provided with a branch groove or projecting groove 16a on a groove edge 16t located on the later grounding side S2. The branch groove 16a slightly projects from an approximately middle position in the axial direction toward the tread edge 2t. Such a branch groove 16a having a small axial length is helpful to enhance the drainage performance of the former grounding sub-groove 16 the axial length of which is set shorter than the later ground sub-groove 15.

The middle inclined sub-groove 17 in this embodiment is formed to have a slight S-shape curve such that a portion from its axially inner end 17i located on the later grounding side S2 to its central portion 17c in the circumferential direction is smoothly curved with gradually increasing an inclination angle γ3 relative to the circumferential direction, and a portion from the central portion 17c to its axially outer end 17o on the former grounding side S1 is smoothly curved with gradually decreasing the inclination angle γ3.

Further, the middle inclined sub-groove 17 in this embodiment is formed so that its inner end 17i is located at approximately the same position in the axial direction as the axially inner end 15i of the later grounding sub-groove 15, and its outer end 17o is located at approximately the same position in the axial direction as the axially outer end 15o of the later grounding sub-groove 15. Therefore, the middle sub-groove 17 can efficiently discharge a water film on a road at a deep bank angle as well as the later grounding sub-groove 15.

While a preferable embodiment of the present invention has been described with reference to the drawings, it goes without saying that the present invention is not limited to only such an embodiment and various changes and modifications may be made.

The present invention is more specifically described and explained by means of the following examples. It is to be understood that the present invention is not limited to these examples.

EXAMPLES

Tires for motorcycle having a basic structure shown in FIGS. 1 and 2 and having inclined main grooves and inclined sub-grooves shown in Table 1 were manufactured and tested. Common specifications are shown below.
Tire size: Front wheel 120/70ZR17
    Rear wheel 180/55ZR17
Rim size: Front wheel MT3.50×17
    Rear wheel MT5.50×17
Tread width TW: 120.0 mm
Tread-developed width TWe: 163 mm
First and second inclined main grooves:
    Groove width W1: 3.0 to 5.5 mm
    Maximum groove depth D1: 3.0 to 4.5 mm
    Inclination angle α of main part: 0 to 25°
First and second inclined sub-grooves:
    Groove width W2: 3.0 to 5.5 mm
    Maximum groove depth D2: 3.0 to 4.3 mm
    Inclination angle γ: 35 to 55°
The performances of the tires were evaluated by the methods described below.
<Rolling Resistance Performance>
The rolling resistance was measured under the following conditions by a rolling resistance testing machine. The results are shown as an index based on the result of Comparative Example 1 regarded as 100. The larger the value, the smaller the rolling resistance and, therefore, the better.
Speed: 80 km/h
Load: 1.30 kN
Inner pressure: 250 kPa
<Drainage Performance>
Tires were mounted on the rims mentioned above, inflated up to an inner pressure of 270 kPa for the front wheel and 290 kPa for the rear wheel, and attached to a 1,300 cc motorcycle. The motorcycle was run on a water-sprinkled test course. The grip performance was evaluated by driver's feeling. The results are shown as an index based on the result of Comparative Example 1 regarded as 100. The larger the value, the better.
<Steering Stability>
The above-mentioned motorcycle was run on a test course of a dry asphalt road, and the steering stability (transition performance) was evaluated by driver's feeling. The results are shown as an index based on the result of Comparative Example 1 regarded as 100. The lager the value, the better.

The test results are shown in Table 1.

It is observed in Table 1 that the motorcycle tires of the Examples according to the present invention can exhibit an enhanced steering stability with maintaining the rolling performance and the drainage performance.

TABLE 1

|  | Com. Ex. 1 | Com. Ex. 2 | Com. Ex. 3 | Com. Ex. 4 | Ex. 1 | Com. Ex. 5 | Ex. 2 |
|---|---|---|---|---|---|---|---|
| Land ratio Lc of crown region (%) | 85 | 88 | 93 | 85 | 87 | 87 | 78 |
| Land ratio Lm of middle region (%) | 90 | 88 | 88 | 90 | 88 | 88 | 88 |
| Land ratio Ls of shoulder region (%) | 89 | 89 | 89 | 89 | 89 | 89 | 89 |
| Absolute value |Lm-Lc| (%) | 5 | 0 | 5 | 5 | 1 | 1 | 10 |
| Absolute value |Ls-Lm| (%) | 1 | 1 | 1 | 1 | 1 | 1 | 1 |
| Angle α1 of main part at tire equator (degree) | 20 | 10 | 10 | 20 | 15 | 25 | 10 |
| Circumferential length L1 of main part (mm) | 135 | 140 | 140 | 135 | 140 | 130 | 150 |
| Ratio L1 /TWe (%) | 83 | 86 | 86 | 83 | 86 | 80 | 92 |
| Circumferential length L2 of sub-part (mm) | 40 | 40 | 40 | 40 | 40 | 40 | 40 |
| Ratio L2/L1 (%) | 30 | 29 | 29 | 30 | 29 | 31 | 27 |

TABLE 1-continued

|  | | | | | | | |
|---|---|---|---|---|---|---|---|
| Circumferential length L3 between inner ends of first or second inclined sub-grooves (mm) | 60 | 60 | 60 | 60 | 60 | 60 | 60 |
| Presence of tapered end portion in first and second inclined sub grooves | yes | yes | yes | yes | yes | yes | yes |
| Circumferential length L4 between inner end of former grounding inclined sub-groove and outer end of main part of inclined main groove (mm) | 5 | 5 | 5 | 5 | 5 | 5 | 5 |
| Circumferential length L5 between outer end of former grounding inclined sub-groove and inner end of main part of inclined main groove (mm) | 11 | 6 | 6 | 11 | 6 | 16 | −4 |
| Rolling resistance performance (index) | 100 | 104 | 102 | 100 | 104 | 102 | 108 |
| Drainage performance (index) | 100 | 100 | 98 | 100 | 100 | 98 | 108 |
| Steering stability (transition performance) (index) | 100 | 90 | 99 | 100 | 101 | 99 | 95 |

|  | Ex. 3 | Ex. 4 | Ex. 5 | Ex. 6 | Ex. 7 | Ex. 8 | Ex. 9 |
|---|---|---|---|---|---|---|---|
| Land ratio Lc of crown region (%) | 83 | 85 | 87 | 87 | 87 | 87 | 87 |
| Land ratio Lm of middle region (%) | 88 | 88 | 88 | 88 | 88 | 88 | 88 |
| Land ratio Ls of shoulder region (%) | 89 | 89 | 89 | 89 | 89 | 89 | 89 |
| Absolute value \|Lm-Lc\| (%) | 5 | 3 | 1 | 1 | 1 | 1 | 1 |
| Absolute value \|Ls-Lm\| (%) | 1 | 1 | 1 | 1 | 1 | 1 | 1 |
| Angle α1 of main part at tire equator (degree) | 10 | 10 | 0 | 5 | 10 | 10 | 10 |
| Circumferential length L1 of main part (mm) | 140 | 130 | 140 | 140 | 140 | 115 | 165 |
| Ratio L1/TWe (%) | 86 | 80 | 86 | 86 | 86 | 71 | 101 |
| Circumferential length L2 of sub-part (mm) | 40 | 40 | 40 | 40 | 40 | 40 | 40 |
| Ratio L2/L1 (%) | 29 | 31 | 29 | 29 | 29 | 35 | 24 |
| Circumferential length L3 between inner ends of first or second inclined sub-grooves (mm) | 60 | 60 | 60 | 60 | 60 | 60 | 60 |
| Presence of tapered end portion in first and second inclined sub-grooves | yes | yes | yes | yes | yes | yes | yes |
| Circumferential length L4 between inner end of former grounding inclined sub-groove and outer end of main part of inclined main groove (mm) | 5 | 5 | 5 | 5 | 5 | 5 | 5 |
| Circumferential length L5 between outer end of former grounding inclined sub-groove and inner end of main part of inclined main groove (mm) | 6 | 16 | 4 | 4 | 4 | 30 | 6 |
| Rolling resistance performance (index) | 106 | 105 | 107 | 106 | 105 | 106 | 106 |
| Drainage performance (index) | 105 | 103 | 108 | 105 | 104 | 98 | 105 |
| Steering stability (transition performance) (index) | 100 | 102 | 90 | 98 | 100 | 99 | 98 |

|  | Ex. 10 | Ex. 11 | Ex. 12 | Ex. 13 | Ex. 14 | Ex. 15 | Ex. 16 |
|---|---|---|---|---|---|---|---|
| Land ratio Lc of crown region (%) | 87 | 87 | 87 | 87 | 87 | 87 | 87 |
| Land ratio Lm of middle region (%) | 88 | 88 | 88 | 88 | 88 | 88 | 88 |
| Land ratio Ls of shoulder region (%) | 89 | 89 | 89 | 89 | 89 | 89 | 89 |
| Absolute value \|Lm-Lc\| (%) | 1 | 1 | 1 | 1 | 1 | 1 | 1 |
| Absolute value \|Ls-Lm\| (%) | 1 | 1 | 1 | 1 | 1 | 1 | 1 |
| Angle α1 of main part at tire equator (degree) | 10 | 10 | 10 | 10 | 10 | 10 | 10 |
| Circumferential length L1 of main part (mm) | 140 | 140 | 140 | 140 | 140 | 140 | 140 |
| Ratio L1/TWe (%) | 86 | 86 | 86 | 86 | 86 | 86 | 86 |
| Circumferential length L2 of sub-part (mm) | 28 | 63 | 29 | 29 | 40 | 40 | 40 |
| Ratio L2/L1 (%) | 20 | 45 | 21 | 21 | 29 | 29 | 29 |
| Circumferential length L3 between inner ends of first or second inclined sub-grooves (mm) | 60 | 60 | 45 | 75 | 60 | 60 | 60 |
| Presence of tapered end portion in first and second inclined sub-grooves | yes | yes | yes | yes | no | yes | yes |
| Circumferential length L4 between inner end of former grounding inclined sub-groove and outer end of main part of inclined main groove (mm) | 5 | 5 | 5 | 5 | 5 | −20 | 20 |
| Circumferential length L5 between outer end of former grounding inclined sub-groove and inner end of main part of inclined main groove (mm) | 6 | 6 | 6 | 6 | 6 | −20 | 20 |
| Rolling resistance performance (index) | 105 | 105 | 106 | 104 | 105 | 105 | 106 |
| Drainage performance (index) | 102 | 107 | 105 | 102 | 104 | 106 | 102 |
| Steering stability (transition performance) (index) | 99 | 98 | 99 | 99 | 99 | 98 | 97 |

What is claimed is:

1. A motorcycle tire comprising:
a tread portion with a tread surface extending between tread edges and curved in an arc-like shape to have a radially outwardly convex profile in the transverse cross section of the tread portion, the tread portion provided in the tread surface with main grooves and sub-grooves, wherein
given a crown region centered on the tire equator and ranging 33% of a tread development width, a pair of shoulder regions each ranging 17% of the tread development width from each tread edge, and a pair of middle regions between the crown region and the shoulder regions,
each said main groove has a main part extending from its inner end positioned on one side of the tire equator in the crown region to its outer end positioned in the shoulder region on the other side of the tire equator,
said main grooves are first main grooves and second main grooves arranged alternately in the tire circumferential direction, wherein the main parts of the first main grooves extend in a circumferential direction to one of the shoulder regions, the main parts of the second main grooves extend in the same circumferential direction to the other shoulder region, and the main parts each intersect the tire equator at an angle of 0 to 15 degrees, three sub-grooves are disposed between every two of the circumferentially adjacent main parts of the main grooves, extend from an inner end positioned in one of the middle regions to an outer end positioned in the adjacent shoulder region, are inclined in the same direction as the adjacent main parts, and include a shorter sub-groove and a longer sub-groove, and wherein the main grooves and the sub-grooves define a land ratio Lc of the crown region, a land ratio Lm of the middle regions and a land ratio Ls of the shoulder regions, which satisfy the relationship: Lc<Lm<Ls.

2. The motorcycle tire of claim 1, wherein the absolute value |Lm−Lc| of a difference between the land ratio Lm in % and the land ratio Lc in % is in a range from 0.5 to 5, and the absolute value |Ls−Lm| of a difference between the land ratio Ls in % and the land ratio Lm in % is in a range from 0.5 to 5.

3. The motorcycle tire of claim 1, wherein the angle α of each said main part with respect to the tire circumferential direction gradually increases toward the outer end from the inner end.

4. The motorcycle tire of claim 1, wherein each said main part has a circumferential length of 70% to 100% of the tread development width.

5. The motorcycle tire of claim 1, wherein each said sub-groove has an axially inner end portion in which the groove width and the inclination angle with respect to the tire circumferential direction are gradually decreased toward the axially inner end.

6. The motorcycle tire of claim 1, wherein in relation to each of the main parts, one of the three sub-grooves adjacent thereto in the inclining direction of said each of the main parts, and one of the main parts next to said each of the main parts in the inclining direction thereof, the absolute value of the circumferential distance between the axially outer end of said each of the main parts and the axially inner end of said one of the sub-grooves is 0 to 20 mm, and the absolute value of the circumferential distance between the axially outer end of said one of the sub-grooves and the axially inner end of the next main part is 0 to 20 mm.

7. The motorcycle tire of claim 1, wherein circumferential distances between the axially inner ends of the circumferentially adjacent sub-grooves are from 45 to 75 mm.

8. A motorcycle tire comprising a tread portion with a tread surface extending between tread edges and curved in an arc-like shape to have a radially outwardly convex profile in the transverse cross section of the tread portion, the tread portion provided in the tread surface with main grooves and sub-grooves, wherein given a crown region centered on the tire equator and ranging 33% of a tread development width, a pair of shoulder regions each ranging 17% of the tread development width from one of the tread edge, and a pair of middle regions between the crown region and the shoulder regions, each said main groove has a main part extending from its inner end positioned on one side of the tire equator in the crown region to its outer end positioned in the shoulder region on the other side of the tire equator, said main grooves are first main grooves and second main grooves arranged alternately in the tire circumferential direction, wherein the main parts of the first main grooves extend to one of the shoulder regions and the main parts of the second main grooves extend to the other shoulder regions, while including to one circumferential direction, and the main parts each intersect the tire equator at an angle of 0 to 15 degrees, three sub-grooves are disposed between every two of the circumferentially adjacent main parts of the main grooves, extend from an inner end positioned in one of the middle regions to an outer end positioned in the adjacent shoulder region, are inclined in the same direction as the adjacent main parts, and include a shorter sub-groove and a longer sub-groove, and wherein the main grooves and the sub-grooves define a land ratio Lc of the crown region, a land ratio Lm of the middle regions and a land ratio Ls of the shoulder regions, which satisfy the relationship: Lc>Lm>Ls.

9. The motorcycle tire of claim 8, wherein the absolute value |Lm−Lc| of a difference between the land ratio Lm in % and the land ratio Lc in % is in a range from 0.5 to 5, and the absolute value |Ls−Lm| of a difference between the land ratio Ls in % and the land ratio Lm in % is in a range from 0.5 to 5.

10. The motorcycle tire of claim 8, wherein the angle α of each said main part with respect to the tire circumferential direction is gradually increased toward the outer end from the inner end.

11. The motorcycle tire of claim 8, wherein each said main part has a circumferential length of 70% to 100% of the tread development width.

12. The motorcycle tire of claim 8, wherein each said sub-groove has an axially inner end portion in which the groove width and the inclination angle with respect to the tire circumferential direction are gradually decreased toward the axially inner end.

13. The motorcycle tire of claim 8, wherein in relation to each of the main part, one of the three sub-grooves adjacent thereto in the inclining direction of said each of the main parts, and one of the main parts next to said each of the main parts in the inclining direction thereof, the absolute value of the circumferential distance between the axially outer end of said each of the main parts and the axially inner end of said one of the sub-grooves is 0 to 20 mm, and the absolute value of the circumferential distance between the axially outer end of said one of the sub-grooves and the axially inner end of the next main part is 0 to 20 mm.

14. The motorcycle tire of claim 8, wherein circumferential distances between the axially inner ends of the circumferentially adjacent sub-grooves are from 45 to 75 mm.

* * * * *